(No Model.)
E. M. GARDNER.
ELECTRODE FOR SECONDARY BATTERIES.
No. 336,102. Patented Feb. 16, 1886.
Fig. 1.
Fig. 2.
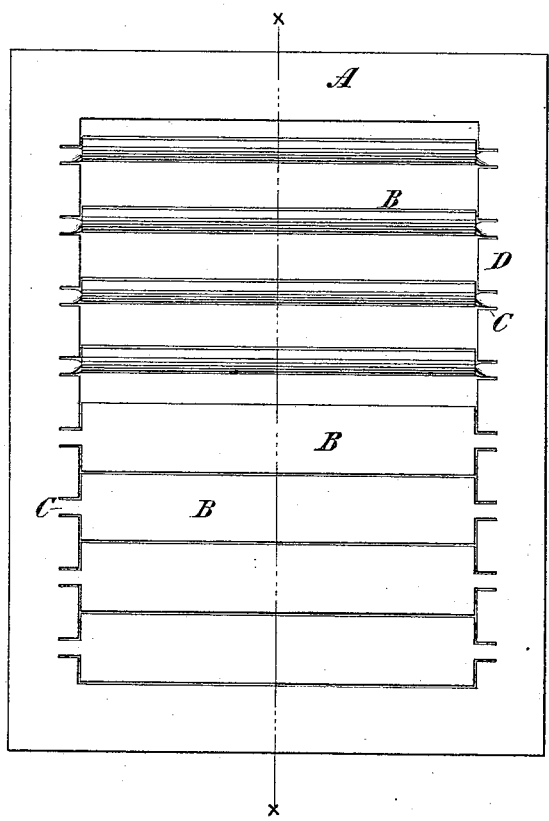
WITNESSES
INVENTOR
Ernest M. Gardner
Park Benjamin
Attorney

UNITED STATES PATENT OFFICE.

ERNEST M. GARDNER, OF BROOKLINE, ASSIGNOR TO JAMES L. LITTLE, JR., OF BOSTON, MASSACHUSETTS.

ELECTRODE FOR SECONDARY BATTERIES.

SPECIFICATION forming part of Letters Patent No. 336,102, dated February 16, 1886.

Application filed May 25, 1885. Serial No. 166,599. (No model.)

*To all whom it may concern:*

Be it known that I, ERNEST M. GARDNER, of Brookline, Norfolk county, Massachusetts, have invented a new and useful Improvement in Electrodes for Secondary Batteries, of which the following is a specification.

My invention relates to an electrode for secondary batteries; and it consists more particularly in the construction of said electrode, hereinafter set forth.

In the accompanying drawings, Figure 1 is a side view of my improved electrode, showing the manner of arranging and supporting the troughs. Fig. 2 is a vertical section on the line *x x* of Fig. 1.

Similar letters of reference indicate like parts.

A is a plate or sheet, preferably of lead. The central portion of said sheet is partly cut or divided, so as to form a series of bars, B, each of said bars being wider than the thickness of the plate, and each bar being united to the outer portion or rim, D, of the plate by the undivided connecting-pieces C thereof. The position and relation of these bars B immediately after the sheet A is cut to produce them is represented at the lower portion of Fig. 1. After the bars B are formed, as described, they are turned from a vertical into a horizontal position, the connecting portions C thus becoming turned or twisted. The edges E of said bars are turned upward, so that said bars finally form a series of troughs extending across the opening in the body of the plate, as shown in the upper portion of Fig. 1 and in Fig. 2. In the troughs thus formed I pack any material, F, which is active in the storage-battery—such, for example, as lead oxide. I prefer to employ the particular composition of lead oxide, carbon, calcined magnesia, and mother liquor from salt manufacture, which I have fully described in another application for Letters Patent filed simultaneously herewith, and serially numbered 166,598. I also prefer to place this material so that it shall completely fill the open spaces both in and between the troughs, which thus become strengthening-pieces and supports for the large body of active material inclosed in the rim or frame D. After the active material has been inserted, as last described, the faces of the electrode are smoothed true and flat.

I have found that an electrode having its supporting-frame made in the manner described—that is, from a single piece of lead containing an outer rim and a central opening, across which extend troughs greater in width than the thickness of the plate—cheapness and simplicity of construction and great strength are secured, and when the active material or composition is thoroughly packed in to fill the troughs and intervening spaces the resulting completed electrode becomes a substantially solid and compact body, not liable to deformation, buckling, or disintegration, and hence possessing superior lasting qualities. I prefer to turn up the edges of the troughs, so as to secure in the latter an arch-shaped cross-section, inasmuch as this form is exceedingly strong and not liable to bending.

I am aware that a battery-plate has hitherto been invented containing single longitudinal strips of V retaining form, said strips being placed one above another, and recesses being formed transversely through the plate, and this construction I do not herein claim.

I claim as my invention—

1. In an electrode for secondary batteries, a metal supporting-plate containing an opening, and in said opening a series of shelves or ledges formed of the material of and integral with said plate, disposed one above the other, and each shelf or ledge extending in width beyond the thickness of the plate on both sides, substantially as described.

2. In an electrode for secondary batteries, a solid metal rim or frame and a series of troughs integral therewith and having upwardly-turned edges disposed within said rim, substantially as described.

3. In an electrode for secondary batteries, a solid metal rim or frame and a series of troughs integral therewith disposed within said rim, and having a curved or arch-shaped transverse cross-section, substantially as described.

4. In an electrode for secondary batteries, a supporting-plate containing an opening, and a series of troughs integral with said plate and extending across said opening, and a material active in the storage-battery contained in said troughs, substantially as described.

5. In an electrode for secondary batteries, a supporting-plate containing an opening, and a series of troughs integral with said plate and extending across said opening, and a material active in the storage-battery contained in said troughs and completely filling the intervening spaces between them, substantially as described.

6. In an electrode for secondary batteries, a supporting-plate containing an opening, and a series of troughs extending across said opening, integral with said plate, and cut therefrom and turned in a horizontal position in the manner set forth, substantially as described.

ERNEST M. GARDNER.

Witnesses:
PARK BENJAMIN,
W. E. DORAN.